United States Patent Office 3,549,480
Patented Dec. 22, 1970

3,549,480
PLASTICIZED CRESYLIC RESIN IMPREGNATION SYSTEM COMPRISING A PHENOL-FORMALDEHYDE RESOLE RESIN, A CRESOL-FORMALDEHYDE RESOLE RESIN AND A HALO ARYL PHOSPHATE
Ronald H. Dahms, Springfield, Mass., assignor to Monsanto Company, St. Louis, Mo., a corporation of Delaware
No Drawing. Filed June 21, 1968, Ser. No. 738,792
Int. Cl. B32b 27/22; C08f 45/50; C08g 5/06
U.S. Cl. 161—191                             5 Claims

ABSTRACT OF THE DISCLOSURE

Compositions of a cresol-formaldehyde resole resin, a phenol-formaldehyde resole resin and a compatible halo aryl phosphate. The compositions are storage stable and can be used for the single pass impregnation of cellulosic sheets which are in turn useable in the manufacture of laminates having fire retardancy, low temperature punchability, low water absorption and good electrical characteristics.

BACKGROUND

In the art of making laminates using phenolic resins and cellulosic substrates, there has been a long felt need for good electricial properties combined with fire retardancy and crack-free punchability. Pure thermoset phenolic resins particularly in combination with cellulosic substrates not only have a tendancy to combust at elevated temperatures, but also have relatively mediocre electrical properties. In addition, they characteristically display a capacity to be punched only at elevated temperatures (e.g. temperatures above about 100° C.) without cracking.

Heretofore, in an effort to combat these deficiencies, the art has attempted to compound plasticizers with liquid phenolic resins before such are impregnated into cellulosic substrates in laminate manufacture. Such combinations, though they have sometimes worked to a degree to accomplish the other desired objectives, have not imparted any particular fire retardancy to the resulting laminates. It has been a very difficult problem to compound liquid phenolic resins with compatible plasticizers which will not only maintain electrical properties and improve punchability in the product laminates, but which will also improve fire retardancy therein, and at the same time not adversely affect other desired properties in a product laminate. The problem of compounding is further complicated by the fact that the art desires to impregnate preformed cellulosic sheets in a single pass operation so that it is necessary to have all components in a single resin treating formulation, making compatibility of components essential.

There has now been discovered a class of liquid phenolic resin formulations suitable for a single pass impregnation of cellulosic preformed substrate members which contains a combination of two different resole resin components and a member of a class of certain fire retardant plasticizers. When this formulation is used for the manufacture of laminates incorporating cellulosic substrates, there are produced product laminates having a surprising combination of good electrical properties, high fire retardancy and relatively low temperature punchability.

SUMMARY

This invention is directed to new and useful solutions of plasticizers and resole resins, to intermediate cellulosic preformed substrate sheet members impregnated therewith, and to thermoset laminates made from such impregnated sheet members.

The solutions of plasticizers and resole resins of this invention are surprising not only because the particular plasticizers employed are compatible with the particular resole resins employed in the respective amounts of each used (i.e. the one type of component does not interact chemically or physically with the other), but also because the resulting solutions are storage stable for prolonged periods of time. The thermoset laminates of this invention are surprising because of their combination of good electrical properties (low dielectric constants and low dissipation factors), good fire retardancy, low water absorption, and relatively low crack free punch temperatures compared to, for example, these same resole resins used without this plasticizer.

The solutions of this invention comprise:

(A) from about 5 to 20 weight percent (total resin solids basis) of water soluble phenol-formaldehyde resole resin having a combined phenol to formaldehyde mol ratio of from about 1.0 to 2.5, (B) from about 50 to 75 weight percent (total resin solids basis) of a cresol-formaldehyde resole resin, (C) from about 15 to 35 weight percent (total solids basis) of at least one organo phosphate of the formula:

(1)
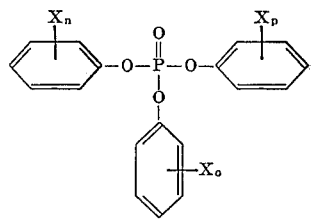

where, each individual X is selected from the group consisting of fluorine, chlorine, bromine, and iodine, and $n$, $o$, and $p$ are each an integer of from 0 through 5 inclusive, and at least one of $n$, $o$ and $p$ in any given molecule is an integer greater than 0, and (D) the balance up to 100 weight percent (total solids basis) of any given solution being an organic liquid which:

(1) is substantially inert (as respects solution components)

(2) evaporates below about 250° C. at atmospheric pressures, and (3) is a mutual solvent for said resins and said organo phosphate.

Optionally, up to about 15 weight percent water can be present in dissolved form in said organic liquid.

The intermediate (non-thermoset) cellulosic preformed substrate sheet members of this invention are impregnated with from about 5 to 70 weight percent (based on total sheet member weight) of solids derived from a solution of this invention.

The laminates made from these intermediate sheet members employ a plurality of such members arranged face to face in a layered configuration and thermoset together under heat and pressure to form an integral article of manufacture.

The water-soluble phenol-formaldehyde resole resin used in the phenolic resin solutions of this invention is produced by reacting under aqueous liquid phase conditions phenol with formaldehyde in the presence of a basic catalyst (preferably organic). It has a low molecular weight as demonstrated by the fact that this resin is water soluble. Thus, a 55 weight percent aqueous solution thereof can be prepared. This solution characteristically has a water dilutability of at least about 1:1, and preferably of at least about 8:1. In addition, this resin has a free formaldehyde content which is less than about 5 weight percent. Preferably, the combined phenol to formaldehyde mol ratio in this resin ranges from about 1 to 2.5. An organic basic catalyst is preferably used in preparation as indicated so as to produce a resole resin product which will not contain free ions which might conduct an electrical charge after the resin has been thermoset. Suitable organic basic catalysts are well known to the art; examples include triethylamine, hexamethylenetetramine, and the like. The preparation of such resins is well known to those of ordinary skill in the art.

The cresol-formaldehyde resole resin has an aldehyde to phenol (including cresol) mol ratio of from about 0.8 to 2.0, and is produced by reacting in the presence of an organic basic catalyst under liquid aqueous phase conditions a cresol-phenol mixture with formaldehyde.

The cresol-formaldehyde resole resin has a relatively high molecular weight as shown by the fact that it is substantially water insoluble but has an acetone solubility such that a 55 weight percent solution thereof can be prepared in acetone. Such acetone solution characteristically has an acetone dilutability of at least about 1:1. In addition, this resin has a free formaldehyde content which is less than about 5 weight percent. Preferably, the aldehyde to combined phenol (including cresol) mol ratio ranges from about 0.9 to 1.5. An organic basic catalyst is used in preparation as indicated for the same reasons as explained above.

In general, to produce a cresol-formaldehyde resole resin for use in this invention a mixture of a cresol and phenol is prepared which contains at least 15 weight percent and preferably at least 20 weight percent of cresol with the balance up to 100 weight percent in any given such mixture being substantially phenol. The cresols of commerce typically contain a mixture of the three different isomers of cresol. This phenol-cresol mixture is added to from about 0.8 to 2.0 mols of formaldehyde per one mol of phenol-cresol mixture. Also a basic catalyst material preferably organic such as hexamethylenetetramine, triethylamine, mixtures thereof, or the like is introduced into the reaction mixture. This reaction mixture is then heated to temperatures of about from about 60 to 100° C. for a time sufficient to produce an aqueous thermosettable cresol-formaldehyde resole resin starting component having the above-indicated properties.

After each of the phenol-formaldehyde and the cresol-formaldehyde resole resins are prepared, they are conveniently and preferably dehydrated, if needed, as by vacuum distillation or the like, so as to have respective water contents under about 15 weight percent each, preferably. For reasons of convenience in preparation, one can dehydrate the cresol-formaldehyde to a water content of, say, below 5 weight percent while leaving the water content of the phenol-formaldehyde resin correspondingly higher. At any rate, it is desired for purposes of this invention to so regulate the water contents of these respective starting phenolic resins that the total water content in a product composition of the invention is under about 15 weight percent.

To prepare a liquid resin composition of this invention, one convenient procedure involves dissolving a substantially completely dehydrated or partially dehydrated liquid cresol-formaldehyde resole resin and a phenol-formaldehyde resin (described above) in an inert, relatively volatile organic solvent. Suitable solvents include alcohols, such as lower alkanols, like ethanol and methanol, and lower alkanones such as di(lower alkyl) ketones like methyl ethyl ketone or acetone. Mixed alkyl aromatic liquids synthesized from petroleum hydrocarbons can be used. Preferred solvents are lower alkanols. Mixtures of different organic liquids can be employed. The term "lower" refers to less than 7 carbon atoms per molecule as used herein. Aromatic and aliphatic (including cycloaliphatic) hydrocarbons can be employed, including cyclohexane, benzene, toluene, xylene, naphthalene, nonane, etc. Water can be present, as indicated. Any convenient preparation procedure can be used.

Those skilled in the art will appreciate that care should be taken to use an organic solvent liquid system in which both phenolic resins are soluble as well as any residual water which may be present owing to the fact that such was not completely removed before hand. Adding, for example, a ketone or an ether-ester solvent like butyl Cellosolve improves the water tolerance (ability to dissolve water) of a solvent system.

The water content of a varnish of this invention can range a high as about 15 weight percent, but preferably is below about 10 weight percent.

The organo phosphates used in the phenolic resin solutions of this invention are characterized by Formula 1 above.

Formula 1 compounds are generally known to the prior art and can be prepared by any convenient synthetic route, for example, one preferred and convenient route is to react phosphorous oxychloride $POCl_3$ with an appropriate halo-phenol. Mixtures of different halophenols (optionally with phenol itself) can be employed.

To prepare a composition of this invention, it is convenient simply to admix together a solution of phenol-formaldehyde resole resin and of cresol-formaldehyde resole resin prepared as above described. In general, simple physical mixing procedures are sufficient and preferred for use in making such a mixture of these two different resole resins. It is then convenient to add to this product mixture at least one organo phosphate of the Formula 1. In general, these phosphates are soluble in the liquid of the mixture in the amounts employed so that no particular problem with dissolution of Formula 1 compound in such a liquid solution of resins is encountered when convenient preparation techniques can be employed to prepare the resin solutions of this invention. Preferred phenolic resin solutions of this invention contain from about 5 to 15 weight percent of the water soluble phenol-formaldehyde resole resin, from about 55 to 70 weight percent of the cresol-formaldehyde resole resin, from about 20 to 30 weight percent of the Formula 1 organo phosphate, and the balance up to 100 weight percent being an organo liquid as described above. Any convenient mixing procedure can be used.

In general, the respective solids contents of each resole resin in a composition of this invention can vary over a wide range, as indicated, but an optimum solids content for a given use situation is chosen by the conditions and equipment employed for application, such as the type of laminate product desired, as those skilled in the art appreciate.

The compositions of this invention are characteristically dark colored, one-phase, clear liquids having a viscosity ranging from about 50–5000 centipoises (preferably about 50 to 500 centipoises). As those skilled in the art will appreciate, the cresol-formaldehyde resin compositions used in this invention can optionally be advanced to a greater extent without forming precipitates from the organic solvent phase than is the case of corresponding aqueous resole resin systems.

As indicated above, the phenolic resin solutions of this invention are particularly well suited for use in the single pass impregnation of cellulosic substrates in laminate manufacture.

In general, an individual cellulosic substrate used in the present invention is a preformed sheet-like condition and need have no special characteristics. It can be composed of cellulosic fibers which optionally can contain up to about 50 weight percent of a synthetic organic polymeric fibrous material, such as a polyester, a polyimide, a vinylidene chloride polymer, and acrylonitrile/vinyl chloride copolymer, mixtures thereof, and the like. Typical thicknesses range from about 3 to 30 mils (under about 10 preferred). The cellulosic substrate, whether or not modified with such a polymeric fibrous material is preferably in an integral, uniform, woven or non-woven, sheet-like condition. Preferably, individual substrate members are composed substantially of cellulose. The cellulosic fibers used in such a substrate member can be of natural or synthetic origin. Typical well known sources for cellulose fibers include wood, cotton, and the like. Typically, and preferably, average fibers used in substrates employed in this invention have length to width ratios of at least about 2:1, and more preferably about 6:1, with maximum length to width ratios being variable.

The term "substantially" as used herein in reference to cellulosic substrates has reference to the fact that such a substrate comprise mainly cellulose fibers with not more than about 5 to 10 percent of any given cellulosic substrate being other components, such as non-fibrous fillers, diluents, and the like, or fibrous non-cellulosic materials, such as those derived from organic sources (e.g. protein, synthetic polymers like polyesters, etc.), or inorganic sources (e.g. siliceous fibers or metallic fibers). Such other components when and if present characteristically have size ranges which are not greater in magnitude than the cellulosic fibers. Preferably, such other components are under one weight percent of the total weight of a starting individual cellulosic substrate member.

Particularly when high electrical properties are desired in a product laminate of the invention, the cellulosic substrate member should have a low ash content. Ash contents under one weight percent (based on total cellulosic substrate member weight) are preferred, and those having ash contents under 0.5 weight percent are more preferred.

In general, impregnation of a preformed substrate cellulosic member with a solution of this invention can be accomplished by any conventional means, including spraying, dipping, coating, or the like, after which it is convenient and preferred to dry the so-treated sheet to remove residual volatile components and thereby leave an impregnated sheet-like construction. In drying, care is used to prevent leaving excessive volatile material in the impregnated sheet. In general, a volatile level of less than about 6 percent by weight is desired.

For purposes of this invention, volatile level is conveniently determined by loss in weight after 10 minutes at 160° C. of a sample impregnated sheet. As indicated, a so-impregnated sheet member contains from about 50 to 70 weight percent of solids derived from said composition.

The product intermediate impregnated sheet member can be considered to be a novel product of this invention.

When such an impregnated intermediate sheet member is to be used in the manufacture of laminates, it is preferred to use such a sheet member which has been advanced to an extent such that it has a flow of from about 3 to 20 percent, (preferably from about 5 to 15 percent). To so advance a sheet member to such a flow, it is convenient to heat in air an intermediate sheet to temperatures in the range of from about 30 to 180° C. for a time sufficient to advance same to the so-desired extent. It will be appreciated that such an advancement can be conveniently accomplished while residual volatile materials are being removed in a drying operation after impregnation, as indicated above.

Intermediate sheet-like members of this invention, whether advanced to the extent indicated or not, are generally at least about 4 mils thick and can be as thick as 25 mils, though thicknesses not more than about 10 mils are preferred.

The density of an individual intermediate sheet-like member is relatively unimportant since the laminate, as described below, is formed under heat and pressure conditions which generally solidify all components together into an integral, solid, non-porous, thermoset mass.

To make a laminate construction of this invention one forms: at least one sheet-like member (preferably advanced as described above) into a layered configuration which is at least two layers thick with adjoining layers being substantially in face-to-face engagement. As those skilled in the art will appreciate, an individual laminate construction of the invention can comprise a series of different impregnated cellulosic substrate members at least one of which is an intermediate sheet-like member of this invention or it can comprise a series of similar such intermediate members depending upon properties desired in the product laminate.

Such a layered configuration is then subjected to pressure in the range of from about 50 to 2000 p.s.i. while maintaining temperatures in the range of from about 120 to 180° C. for a time sufficient to substantially completely thermoset the composite and thereby produce a desired laminate. Preferably the laminate is pressed at 140–160° C. at 500–1500 p.s.i. for 15–60 minutes. It is preferred to use sheet members of this invention as the sole components for laminates of this invention.

The product laminates of this invention find use in a variety of applications, for example, in printed circuit and terminal boards, structural parts, electrical switches, instrument panels, switch parts, and so forth. Individual sheet members can be used as filter media, battery separators, etc.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of cresol-formaldehyde resins are prepared as follows:

EXAMPLES A–E

In these examples, the phenol-cresol resole resin made in each instance has an aldehyde to phenol-cresol ratio of from about 0.8 to 2.0, is produced by reacting under aqueous liquid phase conditions formaldehyde and a phenol-cresol mixture in the presence of an organic basic catalyst, is substantially insoluble in water but soluble in acetone to an extent that a 55 weight percent solution thereof in acetone can be prepared, and has a free formaldehyde content of less than about 5 weight percent.

Measured amounts of phenol, cresol, hexamethylenetetramine, and formalin, respectively, are charged to a reactor and the resulting mixture is heated to 90° C. until a resin is formed. The reaction product typically has a 60% resin solids content. This reaction product in each instance is vacuum stripped to remove almost all water and other volatile components and the residue is dissolved in ethanol to produce a varnish having a viscosity in the range of from 200 to 500 centipoises. Each product varnish has a water content of from about 1 to 4 weight percent (based on total varnish weight). The results are tabulated in Table I.

TABLE 1

| Example | Phenol | Cresol | Hexamethylenetetramine | Formalin* | Reflux time, °C. | Solvent |
|---------|--------|--------|------------------------|-----------|------------------|---------|
| A | 80 | 20 | 3 | 70 | 90 | Ethanol. |
| B | 60 | 40 | 3 | 70 | 90 | Do. |
| C | 40 | 60 | 3 | 70 | 90 | Do. |
| D | 20 | 80 | 3 | 70 | 90 | Do. |
| E | 0 | 100 | 3 | 70 | 90 | Do. |

*Formalin is 50% solution of formaldehyde in water.

EXAMPLE F

A reaction vessel is charged with phenol (100 parts), cresylic acid (33.3 parts), 50% formalin (88.8 parts) and hexamethylenetetramine (3.84 parts). After refluxing at 90° C. for 2.6 hours, the resin is vacuum stripped to remove water. To the resin was added ethanol (70 parts), Abalyn (10.7 parts) and 60% rosin solution (26.7 parts). A 58.9% solids solution was obtained having a viscosity of 281 centipoises.

Examples of water soluble phenol-formaldehyde resole resins having a combined phenol-formaldehyde mol ratio of from about 1.0 to 2.5 suitable for use in this invention are as follows:

EXAMPLE G

Phenol (100 parts), 50% formalin (111 parts) and triethylamine (5 parts) are charged to a vessel. The resulting mixture is reacted at about 70° C. until the free formaldehyde content is less than about 4%, after which the mixture is cooled. The product is a low molecular weight water soluble phenol-formaldehyde resole resin.

EXAMPLE H

Phenol (100 parts), 50% formalin (80 parts), and triethylamine (5 parts) are charged to a vessel. The resulting mixture is reacted at about 70° C. until the free formaldehyde content is less than about 4%, after which the mixture is cooled. The product is a low molecular weight water soluble phenol-formaldehyde resole resin.

EXAMPLE I

Phenol (100 parts), 50% formalin (128 parts) and triethylamine (5 parts) are charged to a vessel. The resulting mixture is reacted at about 70° C. until the free formaldehyde content is less than about 4%, after which the mixture is cooled. The product is a low molecular weight water soluble phenol-formaldehyde resole resin.

Examples of organo phosphate compounds of Formula 1 suitable for use in the phenolic resin solutions of this invention are as follows:

J = o-chlorophenyl diphenyl/phosphate
K = tri(o-chlorophenyl) phosphate
L = 2,4-bromophenyl diphenyl phosphate
M = p-bromophenyl diphenyl phosphate
N = di(o-chlorophenyl) phenyl phosphate
O = di(2,4-dichlorophenyl) phenyl phosphate The following examples illustrate phenolic resin solutions of this invention. In each instance, preparation is accomplished by mixing together the indicated quantities of components selected from the foregoing Examples A–O.

| | Substituted phenolic resin | | Water-soluble phenolic resin | | Formula I compound | |
|---------|------|--------|------|--------|------|--------|
| Example | Type | Amount | Type | Amount | Type | Amount |
| 1 | A | 100 | G | 20 | J | 25 |
| 2 | B | 100 | G | 20 | J | 25 |
| 3 | C | 100 | G | 20 | J | 25 |
| 4 | D | 100 | G | 20 | J | 25 |
| 5 | E | 100 | G | 20 | J | 25 |
| 6 | D | 100 | H | 20 | J | 25 |
| 7 | D | 100 | I | 20 | J | 25 |
| 8 | D | 100 | G | 20 | K | 25 |
| 9 | D | 100 | G | 20 | L | 25 |
| 10 | D | 100 | G | 20 | M | 25 |
| 11 | D | 100 | G | 20 | N | 25 |
| 12 | D | 100 | G | 20 | O | 25 |

EXAMPLES 13–27

Samples of preferred cellulosic substrate types are chosen, as follows:

Type 1: non-woven cotton linters paper, about 10 mils in thickness.

Type 2: Non-woven unbleached Kraft paper about 7 mils in thickness.

Type 3: Non-woven α-cellulose paper about 10 mils in thickness.

Type 4: Non-woven bleached Kraft paper about 15 mils in thickness.

All types have an ash content less than about 0.9 weight percent.

The impregnation procedure for impregnating each above substrate is as follows:

Preformed cellulosic sheets are passed through the impregnating solution (Example 6), drawn through the nip region between a pair of squeeze rolls to remove excess resin and hung in an oven at 135° C. for drying to a volatile content of less than 6%. Volatile content is the loss of weight of the dried impregnated sheet after exposure to 160° C. for 10 minutes. A resin content of about 60% and a flow of about 5% is thus obtained in each sample sheet so treated. Examples are illustrated in Table 3 below.

For purposes of this invention, flow of a green resin sheet is determined by the following procedure.

From an impregnated sample sheet, 6–2" diameter discs are cut and assembled together in deck fashion in face-to-face engagement. Then to opposed faces of the resulting deck there is applied about 1000 p.s.i. pressure using 150° C. for 5 minutes. Thereafter, the discs are cooled and any resin which has exuded from the discs is removed by abrasion, scraping, or the like. The difference in weight between the green sandwich and the pressed sandwich is flow.

The volatile content of each such sheet is less than 6%. The results are summarized in Table 3 below.

TABLE 3

| Example | Preformed sheet type | Resin solution | Flow, percent |
|---------|---------------------|----------------|---------------|
| 13 | 1 | 6 | 3 |
| 14 | 2 | 6 | 6 |
| 15 | 3 | 6 | 5 |
| 16 | 4 | 6 | 5 |
| 17 | 1 | 1 | 3 |
| 18 | 1 | 2 | 6 |
| 19 | 1 | 3 | 6 |
| 20 | 1 | 4 | 3 |
| 21 | 1 | 5 | 4 |
| 22 | 1 | 7 | 4 |
| 23 | 1 | 8 | 4 |
| 24 | 1 | 9 | 9 |
| 25 | 1 | 10 | 5 |
| 26 | 1 | 11 | 5 |
| 27 | 1 | 12 | 4 |

Examples of laminates of this invention are prepared as follows:

EXAMPLES 28 TO 42

Using the intermediate sheet-like members prepared above in Examples 13 to 27, laminates are prepared.

The lamination procedure involves the steps of first assembling a prechosen plurality of intermediate sheet-like members into a deck or sandwich and then applying to the opposed exposed faces of the resulting deck appropriate heat and pressure for a time sufficient to substantially completely cure the impregnated resins and produce the desired laminates. These laminates have excellent puchability and electrical chracteristics. The details are summarized in Table 4 below:

TABLE 4

| Example | Impregnated cellulosic sheet members as described in Example No.— | No. of layers used | Laminate forming conditions | | |
|---|---|---|---|---|---|
| | | | Pressure, p.s.i. | Temp., °C. | Time, min. |
| 28 | 13 | 8 | 1,000 | 160 | 30 |
| 29 | 14 | 9 | 1,000 | 150 | 45 |
| 30 | 15 | 7 | 1,000 | 155 | 40 |
| 31 | 16 | 5 | 1,300 | 150 | 60 |
| 32 | 17 | 8 | 1,000 | 160 | 30 |
| 33 | 18 | 8 | 1,000 | 160 | 30 |
| 34 | 19 | 8 | 1,000 | 160 | 30 |
| 35 | 20 | 8 | 1,000 | 160 | 30 |
| 36 | 21 | 8 | 1,000 | 160 | 30 |
| 37 | 22 | 8 | 1,000 | 160 | 30 |
| 38 | 23 | 8 | 1,000 | 160 | 30 |
| 39 | 24 | 8 | 1,000 | 160 | 30 |
| 40 | 25 | 8 | 1,000 | 160 | 30 |
| 41 | 26 | 8 | 1,000 | 160 | 30 |
| 42 | 27 | 8 | 1,000 | 160 | 30 |

In general, to thermoset (cure) an intermediate cellulosic substrate impregnated with a substituted phenol-formaldehyde resin in accordance with the teachings of this invention, one conveniently heats the so-impregnated structure to a temperature ranging from about 200 to 350° F. for a time of from about 1 to 45 minutes, though lower and higher times and temperatures can be used.

What is claimed is:
1. A liquid composition adapted for use in the single-pass impregnation of cellulosic substrates comprising:
   (A) from about 5 to 20 weight percent of water-soluble phenol-formaldehyde resole resin having a phenol to formaldehyde mol ratio of from about 1.0 to 2.5,
   (B) from about 50 to 75 weight percent of a cresol-formaldehyde resole resin having a combined phenol (including cresol) to formaldehyde mol ratio of about 0.9 to 1.5 and containing at least 15 weight percent cresol among a starting reactant mixture of phenol and cresol,
   (C) from about 15 to 35 weight percent of at least one organo phosphate of the formula:

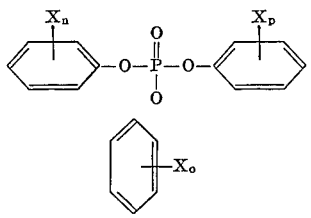

where, each individual X is selected from the group consisting of fluorine, chlorine, bromine, and iodine, and $n$, $o$, and $p$ are each an integer of from 0 through 5 inclusive, and at least one of $n$, $o$ and $p$ in any given molecule is an integer greater than 0, and
   (D) the balance up to 100 weight percent of any given solution being substantaily an organic liquid which:
   (1) is substantially inert,
   (2) evaporates below about 150° C. at atmospheric pressures,
   (3) is a mutual solvent for said resins and said organo phosphate.

2. An intermediate sheet-like member adapted for use in the manufacture of punchable laminates comprising:
   (A) a substrate member in sheet form comprising at least 50 weight percent cellulosic fibers with the balance up to 100 weight percent of any given such member being a synthetic organic polymeric material,
   (B) said substrate being impregnated with a composition of claim 1 so that said substrate contains from about 50 to 70 weight percent of total solids (dry total sheet-like member weight basis) derived from a composition of claim 1.

3. A sheet-like member of claim 2 which has been heated to temperatures in the range of from about 30 to 80° C. for a time sufficient to advance resin solids impregnated into said sheet member to an extent such that said sheet-like member has a flow of from about 3 to 20 percent.

4. A laminate having relatively low water-absorption characteristics, fire retardancy characteristics, relatively low crack free punch temperature characteristics, relatively low dielectric constants and relatively low dissipation factors, prepared by the steps of:
   (A) providing at least one sheet-like member of claim 3 and assembling into a layered configuration at least two layers thick with adjoining layers being substantially in face-to-face engagement and
   (B) subjecting the so-resulting layered configuration to pressures in the range of from about 50 to 2000 p.s.i. while maintaining temperatures in the range of from about 120 to 180° C. for a time sufficient to substantially completely thermoset both said first composition and said second composition and thereby produce a desired laminate.

5. A sheet-like member of claim 2 which has been subjected to elevated temperatures for a time sufficient to substantially completely thermoset resin solids therein.

References Cited
UNITED STATES PATENTS

| 2,351,716 | 6/1944 | Smith | 260—838 |
| 2,593,926 | 4/1952 | Simons | 260—838 |
| 2,834,745 | 5/1958 | Weber et al. | 260—32.8 |
| 2,979,484 | 4/1961 | Redfarn | 260—51 |
| 3,058,941 | 10/1962 | Birum | 260—30.6 |
| 3,377,317 | 4/1968 | Hoxie | 260—30.6 |

JOHN T. GOOLKASIAN, Primary Examiner

D. J. FRITSCH, Assistant Examiner

U.S. Cl. X.R.

117—136, 155, 161; 156—335; 161—258, 259, 263, 264, 403; 260—30.6, 45.7, 838

PO-1050
(5/69)

UNITED STATES PATENT OFFICE
CERTIFICATE OF CORRECTION

Patent No. 3,549,480       Dated December 22, 1970

Inventor(s) Ronald H. Dahms

It is certified that error appears in the above-identified patent and that said Letters Patent are hereby corrected as shown below:

Column 8, at lines approximately 60 through 65 in TABLE 3, column 4 of that Table, the last eight numbers are completely different from the last eight numbers originally appearing in TABLE 3 in the application as filed and prosecuted, as shown by the following tabular reproduction:

TABLE 3 (Abbreviated)

| Column 1 (Example) | Column 4 (Flow, per cent) Nos. appearing in Patent as Published | Correct Column 4 |
|---|---|---|
| 20 | 3 | 4 |
| 21 | 4 | 5 |
| 22 | 4 | 4 |
| 23 | 4 | 4 |
| 24 | 5 | 5 |
| 25 | 5 | 4 |
| 26 | 5 | 5 |
| 27 | 4 | 5 |

Signed and sealed this 10th day of August 1971.

(SEAL)
Attest: